(12) United States Patent
Lu et al.

(10) Patent No.: US 9,811,675 B2
(45) Date of Patent: Nov. 7, 2017

(54) GENERATION AND USE OF A MODIFIED PROTECTED FILE

(71) Applicant: EMC IP Holding Company LLC, Hopkinton, MA (US)

(72) Inventors: Howard Lu, Watertown, MA (US); Yongjian Feng, Newton, MA (US); Christopher Hebert, Framingham, MA (US); Jean-Claude Paul, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 14/937,680

(22) Filed: Nov. 10, 2015

(65) Prior Publication Data

US 2016/0078241 A1 Mar. 17, 2016

Related U.S. Application Data (63) Continuation of application No. 13/725,609, filed on Dec. 21, 2012, now Pat. No. 9,275,233.

(51) Int. Cl.
*G06F 21/00* (2013.01)
*G06F 12/14* (2006.01)
(Continued)

(52) U.S. Cl.
CPC .... *G06F 21/6209* (2013.01); *G06F 17/30179* (2013.01); *G06F 21/10* (2013.01);
(Continued)

(58) Field of Classification Search
CPC .. G06F 21/10; G06F 21/6218; G06F 21/6209; G06F 21/125; G06F 11/3624; G06F 11/3636; G06F 17/30179; G06F 9/4425; H04L 63/0428; H04L 2463/101; H04L 29/06027; H04L 67/04; H04L 67/303; H04N 21/234309; H04N 21/2541; H04N 21/26606; H04N 21/4622; H04N 21/85406
See application file for complete search history.

(56) References Cited

U.S. PATENT DOCUMENTS 5,307,498 A * 4/1994 Eisen ............... G06F 9/4425
712/E9.082
5,699,428 A * 12/1997 McDonnal ........... G06F 21/602
713/165

(Continued)

OTHER PUBLICATIONS

Adobe Systems Inc. "Portable Document Format Reference Manual Version 1.3", Aug. 1997.*

(Continued)

*Primary Examiner* — Michael Simitoski
(74) *Attorney, Agent, or Firm* — Van Pelt, Yi & James LLP (57) ABSTRACT

Generating a modified protected file is disclosed, including: renaming a primary content object of a protected file; and creating a modified protected file based at least in part by inserting into the protected file a replacement object for the renamed primary content object. Using the modified protected file is disclosed, including: determining that a file includes a renamed primary content object; and redirecting a data access operation to the renamed primary content object.

12 Claims, 10 Drawing Sheets

(51) Int. Cl.
*G06F 21/62* (2013.01)
*G06F 21/60* (2013.01)
*H04L 29/08* (2006.01)
*G06F 17/30* (2006.01)
*G06F 21/10* (2013.01)
*H04L 29/06* (2006.01)

(52) U.S. Cl.
CPC .......... *G06F 21/60* (2013.01); *H04L 63/0428* (2013.01); *H04L 67/02* (2013.01); *H04L 69/329* (2013.01); *G06F 2221/2107* (2013.01); *G06F 2221/2135* (2013.01); *H04L 67/06* (2013.01); *H04L 2463/101* (2013.01); *Y10S 707/99942* (2013.01)

(56) References Cited

U.S. PATENT DOCUMENTS

| | | | | |
|---|---|---|---|---|
| 5,857,204 | A * | 1/1999 | Lordi | G06F 9/466 |
| 5,991,402 | A * | 11/1999 | Jia | G06F 21/10 |
| | | | | 705/51 |
| 6,026,417 | A * | 2/2000 | Ross | G06F 17/24 |
| | | | | 707/999.003 |
| 6,535,894 | B1 * | 3/2003 | Schmidt | G06F 8/68 |
| 6,615,224 | B1 * | 9/2003 | Davis | G06F 17/30067 |
| | | | | 707/610 |
| 6,629,150 | B1 * | 9/2003 | Huded | G06F 21/64 |
| | | | | 707/999.004 |
| 7,823,064 | B1 * | 10/2010 | Levy | G06F 17/2205 |
| | | | | 707/661 |
| 8,479,087 | B2 * | 7/2013 | Swineford | G06F 17/21 |
| | | | | 715/200 |
| 2001/0031150 | A1 * | 10/2001 | Shimada | G03G 15/50 |
| | | | | 399/82 |
| 2002/0138593 | A1 * | 9/2002 | Novak | H04L 29/06027 |
| | | | | 709/219 |
| 2003/0014655 | A1 * | 1/2003 | England | G06F 21/10 |
| | | | | 726/26 |
| 2004/0039926 | A1 * | 2/2004 | Lambert | G06F 21/125 |
| | | | | 713/189 |
| 2004/0107356 | A1 * | 6/2004 | Shamoon | H04L 63/0428 |
| | | | | 713/193 |
| 2004/0168184 | A1 * | 8/2004 | Steenkamp | H04N 7/163 |
| | | | | 725/31 |
| 2004/0230806 | A1 * | 11/2004 | Lisanke | G06F 21/10 |
| | | | | 713/182 |
| 2004/0249497 | A1 * | 12/2004 | Saigh | E04H 14/00 |
| | | | | 700/216 |
| 2005/0015608 | A1 * | 1/2005 | Peterson | G06F 21/6218 |
| | | | | 713/193 |
| 2005/0066117 | A1 * | 3/2005 | Ramsey | G11B 20/00086 |
| | | | | 711/112 |
| 2005/0114672 | A1 * | 5/2005 | Duncan | G06F 21/10 |
| | | | | 713/182 |
| 2005/0138088 | A1 * | 6/2005 | Basin | G06F 17/30153 |
| 2005/0248790 | A1 * | 11/2005 | Ornstein | G06F 17/2229 |
| | | | | 358/1.12 |
| 2005/0273629 | A1 * | 12/2005 | Abrams | G06F 21/10 |
| | | | | 713/189 |
| 2006/0069791 | A1 * | 3/2006 | Patrick | H04L 67/2823 |
| | | | | 709/230 |
| 2006/0143252 | A1 * | 6/2006 | Perterson | G06F 17/30153 |
| 2007/0106932 | A1 * | 5/2007 | Coar | G06F 17/30011 |
| | | | | 715/234 |
| 2007/0226238 | A1 * | 9/2007 | Kiilerich | G11B 27/034 |
| 2008/0016078 | A1 * | 1/2008 | Karlsson | G06F 21/6218 |
| 2008/0114768 | A1 * | 5/2008 | Sadovsky | G06F 21/10 |
| 2008/0114782 | A1 * | 5/2008 | Sadovsky | G06F 17/30014 |
| 2008/0114797 | A1 * | 5/2008 | Jones | G06F 17/30011 |
| 2008/0115055 | A1 * | 5/2008 | Sadovsky | G06F 17/2264 |
| | | | | 715/255 |
| 2009/0177636 | A1 * | 7/2009 | Cohn | G06F 17/30887 |
| 2009/0199287 | A1 * | 8/2009 | Vantalon | G06F 21/10 |
| | | | | 726/9 |
| 2009/0319529 | A1 * | 12/2009 | Bartlett | G06F 21/6209 |
| 2010/0036908 | A1 * | 2/2010 | Leblanc | G06F 17/30905 |
| | | | | 709/203 |
| 2010/0094900 | A1 * | 4/2010 | Hughes, Jr. | G06F 17/3002 |
| | | | | 707/770 |
| 2010/0153739 | A1 * | 6/2010 | Guymon, Jr. | G06F 21/64 |
| | | | | 713/189 |
| 2010/0165380 | A1 * | 7/2010 | Grams | G06K 15/1815 |
| | | | | 358/1.15 |
| 2010/0235649 | A1 * | 9/2010 | Jeffries | G06F 21/6209 |
| | | | | 713/189 |
| 2010/0257569 | A1 * | 10/2010 | O'Hanlon | G11B 27/10 |
| | | | | 725/110 |
| 2010/0263060 | A1 * | 10/2010 | Charbonneau | G06F 21/6218 |
| | | | | 726/30 |
| 2011/0061110 | A1 * | 3/2011 | Koeten | G06F 21/6209 |
| | | | | 726/28 |
| 2011/0113257 | A1 * | 5/2011 | Basin | G06F 17/30153 |
| | | | | 713/189 |
| 2012/0150793 | A1 * | 6/2012 | Carroll | G06F 17/30082 |
| | | | | 707/602 |
| 2012/0198559 | A1 * | 8/2012 | Venkata Naga Ravi | G06F 21/62 |
| | | | | 726/26 |
| 2012/0297462 | A1 * | 11/2012 | Peckover | G06F 21/6245 |
| | | | | 726/4 |
| 2012/0311279 | A1 * | 12/2012 | Hong | G06F 11/1461 |
| | | | | 711/162 |
| 2013/0024700 | A1 * | 1/2013 | Peterson | H03M 7/30 |
| | | | | 713/189 |
| 2013/0117418 | A1 * | 5/2013 | Mutton | H04N 19/40 |
| | | | | 709/219 |
| 2013/0346379 | A1 * | 12/2013 | Loe | H04L 63/0428 |
| | | | | 707/693 |
| 2014/0304761 | A1 * | 10/2014 | Wicker | G06F 21/10 |
| | | | | 726/1 |

OTHER PUBLICATIONS

Berkeley. "WinZip Instructions", Jun. 2010.*
Schmidt, Andreas U., Omid Tafreschi, and Ruben Wolf. "Interoperability challenges for DRM systems." IFIP/GI workshop on virtual goods, Ilmenau, Germany. 2004.*
WinZip. "Explanation of Freshen and other Action options", Apr. 2012.*
WinZip. "WinZip 12 Reviewer's Guide", 2008.*

* cited by examiner

Rename a primary content object of a protected file — 704

Create a modified protected file based at least in part by inserting into the protected file a replacement object for the renamed primary content object — 706

GENERATION AND USE OF A MODIFIED PROTECTED FILE

CROSS REFERENCE TO OTHER APPLICATIONS

This application is a continuation of co-pending U.S. patent application Ser. No. 13/725,609, entitled GENERATION AND USE OF A MODIFIED PROTECTED FILE filed Dec. 21, 2012 which is incorporated herein by reference for all purposes.

BACKGROUND OF THE INVENTION

Information rights management technologies add security measures to files by controlling the manner in which sensitive information may be accessed. However, certain devices and/or operating systems do not permit the download or installation of certain software add-ons that are necessary to enable a viewer application to view files protected by information rights management techniques. As a result, users of such devices and/or operating systems have trouble attempting to view such protected files and may not know what can be done to make the protected files viewable at the devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to provide secure access to content are described herein. In various embodiments, a modified protected file is created. The modified protected file may be based on a protected file. The protected file may be encrypted and/or include data protected by information rights management (IRM) techniques. In some embodiments, the protected file and a template file are used to create a modified protected file. The template file includes, in various embodiments, at least some unprotected data that may be displayed by a device that does not include an IRM client and which, as a result, may not be able to render the original protected file. The unprotected data of the template file includes instructions (e.g., in text, images, audio, video) that describe what a user should do to enable a device (that is not associated with the IRM client) to render the protected file. In various embodiments, an IRM client comprises computer code and/or logic that enable a viewer application at a device to view content protected by IRM techniques. The template file and the protected file are processed together to create a modified protected file that includes the protected file and at least some of the unprotected data of the template file.

Techniques to use a modified protected file are described herein. For example, the created modified protected file may be sent to a device. If the device includes an IRM client, the device is able to view content protected using IRM techniques. In the event that the device includes an IRM client, in some embodiments, a data access operation to a modified protected file is received and it is determined with assistance from the IRM client that the modified protected file includes a protected file, such as a file derived from a protected OpenXML file, for example. Then the data access operation is redirected to the protected file portion of the modified protected file and the protected file is displayed at the device. In some embodiments, a modified protected file is received and it is determined that the modified protected file includes one or more objects that are associated with a protected file, such as a protected Portable Document Format (PDF) file, for example. Then the one or more objects that are associated with the protected file are displayed.

However, if the device that receives a modified protected file does not include an IRM client, then the protected file or a portion thereof will not be displayed. Instead, in the event that the device does not include an IRM client, a viewer application at the device that does not recognize IRM protected content will recognize the portion of the modified protected file that is associated with the unprotected data of the template file that includes instructions (e.g., in text, images, audio, video) that describe what a user should do to enable the device to render the protected file, e.g., by downloading and using a special application associated with a IRM client to access the data. The viewer application will display the instructions to the user.

As described above, the modified protected file either enables a device with an IRM client to view the protected content included in the modified protected file or enables a device without the IRM client to view the unprotected content including a set of instructions that inform the viewing user of what should be done to cause the protected content to be displayed. So regardless of whether a device that receives the modified protected file is capable of viewing the protected file, the device is at least capable to display instructions that describe what a user should do to enable the device to render the protected file.

Figure 1:
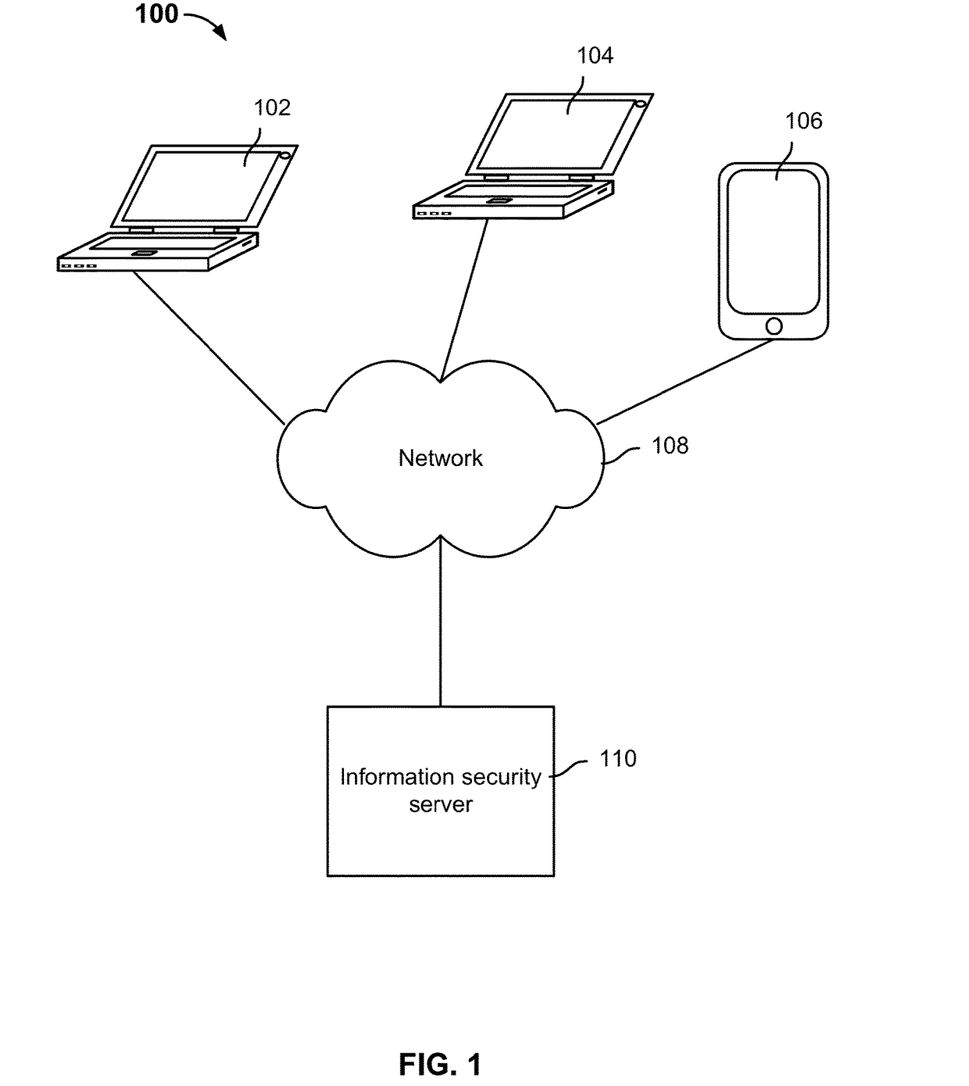
FIG. 1 is a diagram showing an embodiment of a system for generating and using modified protected files.

FIG. 1 is a diagram showing an embodiment of a system for generating and using modified protected files. In the example, system 100 includes device 102, device 104, device 106, network 108, and information security server 110. Device 102, device 104, device 106, and information security server 110 may communicate to each other over network 108. Network 108 may include high-speed data networks and/or telecommunications networks.

Each of devices 102, 104, and 106 may comprise a laptop computer, a desktop computer, a mobile device, a smart phone, a tablet device, or any other computing device. However, for purposes of illustration, in the following example, device 102 is a laptop computer, device 104 is a laptop computer, and device 106 is a tablet device. The example is as follows:

User Alex drafts an email at device 102 that he wishes to send to some of his colleagues with an attached file. The file to be attached to the email includes sensitive information so Alex decides to apply IRM protection to the file. For example, the file may be an OpenXML file or a PDF file. In response to Alex making a selection associated with applying IRM protection to the file, an IRM client installed at device 102 applies IRM protection to the file. In some embodiments, applying IRM protection to a file includes encrypting the file with a key and/or indicating security policy for the file (e.g., the identification of one or more other users who are granted access to the protected file). In some embodiments, in applying IRM protection to the file, the IRM client of device 102 is configured to send and/or receive security information associated with the file (e.g., the encryption key and the security policy) with information security server 110. In some embodiments, information security server 110 is configured to store security information associated with the protected file so that the security information may be later used to grant the same user or another user access to the protected file.

In some embodiments, before the email with the protected file may be sent by Alex from device 102, a template file including data that provides instructions that describes what a user should do to enable the device to display the protected file (on a device that does not have an IRM client) is received from information security server 110 and the protected file is processed together with the template file at device 102 to create a modified protected file. In some embodiments, the modified protected file includes the protected file and at least some of the unprotected data (e.g., set of instructions) from the template file. In some embodiments, the protected file is sent from device 102 to information security server 110 and information security server 110 processes the protected file together with the template file to generate a modified protected file, which is then sent to device 102. Regardless of where the modified protected file is created, device 102 is configured to the send the email with the attached modified protected file to the email addresses of Brenda and Cameron.

While user Brenda checks her email at device 104, she sees the email with the attachment from Alex and selects to open the attached file, which is the modified protected file. The IRM client is installed at device 104 so device 104 is capable of viewing the protected file included in the modified protected file. For example, the IRM client is a plug-in to be used with a viewer application, such as Microsoft Word® or Adobe Acrobat Reader®. In some embodiments, in response to Brenda's selection to view to the attached modified protected file, a data access operation is made by a viewer application (e.g., Microsoft Word® or Adobe Acrobat Reader®) installed at device 104 to open the modified protected file. The IRM client is configured to intercept the data access operation (e.g., from Microsoft Word®) and inspect the modified protected file (e.g., the modified protected file comprises an OpenXML file) to determine whether there is a portion that is associated with a protected file. If the protected file is detected, the IRM client may extract the protected file from the modified protected file and store the extracted protected file into a temporary file. Then the IRM client is configured to redirect the data access operation to the temporary file so that the viewer application may display the contents of the protected file. Furthermore, in some embodiments, in response to Brenda's selection to view to the attached modified protected file (e.g., a PDF file), the IRM client is configured to determine that content object(s) of the modified protected file are associated with a protected file. Then the IRM client is configured to cause the viewer application (e.g., Adobe Acrobat Reader®) to display the one or more content object(s) of the modified protected file. In some embodiments, before opening the protected file included in the modified protected file, the IRM client at device 104 is configured to contact information security server 110 to ensure that access is to be granted to device 104 and/or to user Brenda. For example, device 104 may be configured to request from information security server 110 the set of security information associated with the protected file to be opened and/or for authentication to be performed by information security server 110 on device 104 and/or Brenda.

While user Cameron checks his email at device 106, he sees the email with the attachment from Alex and selects to open the attached file, which is the modified protected file. The IRM client is not installed at device 106 so device 106 is not capable of viewing the protected file included in the modified protected file. For example, the IRM client may not be installed at device 106 because the policies of the operating system (e.g., the Apple® iOS operating system) installed at device 106 does not permit the installation of certain software such as the IRM client (e.g., a plug-in). In some embodiments, in response to Cameron's selection to view to the attached modified protected file, a viewer application (e.g., iBook®, Quick Look®, Quick Office®) installed at device 106 that is not capable of displaying content protected by IRM techniques is configured to determine an unprotected portion of the modified protected file that the application is capable of displaying. The unprotected portion of the modified protected file that the application is capable of displaying may include the instructions that describe what a user (Cameron) should do to enable a device such as device 106 to display the protected file included in the modified protected file. Device 106 is configured to display such instructions. In some embodiments, the instructions may instruct the user to download an application specific for rendering content protected by IRM techniques (e.g., an application that is associated with a IRM client). In some embodiments, computer code and/or logic for the application specific for rendering content protected by IRM techniques may be downloaded from information security server 110. In some embodiments, once the application specific for rendering content protected by IRM techniques is downloaded to and installed at device 106, the application may be used to view the protected file of the modified protected file.

Figure 2:
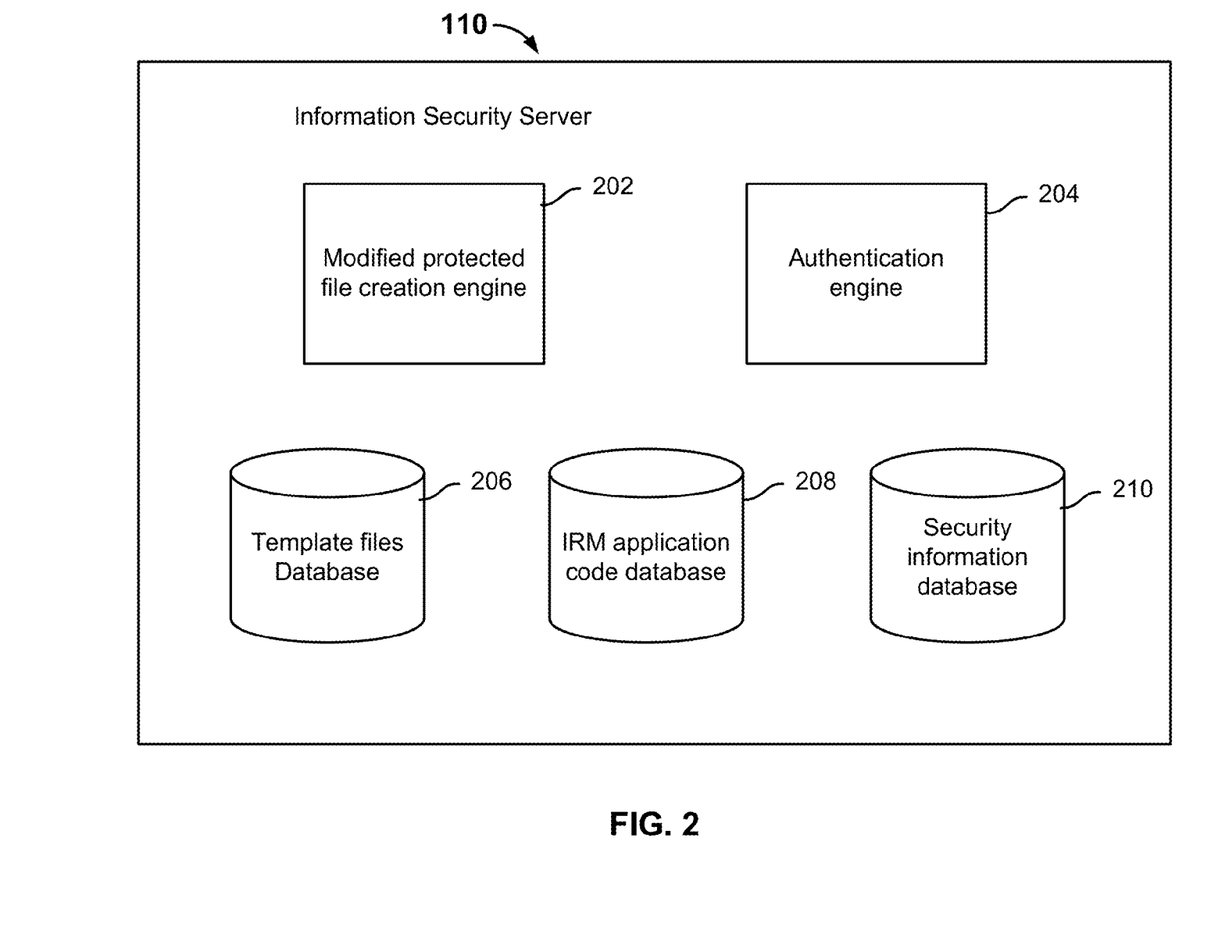
FIG. 2 is a diagram showing an example of an information security server.

FIG. 2 is a diagram showing an example of an information security server. In some embodiments, information security server 110 of system 100 of FIG. 1 may be implemented using the example of FIG. 2. In the example, the information security server includes modified protected file creation engine 202, authentication engine 204, template files database 206, IRM application code database 208, and security information database 210. In some embodiments, each of protected file creation engine 202 and authentication engine 204 is implemented using one or both of software and hardware. In some embodiments, each of template files database 206, IRM application code database 208, and security information database 210 is implemented as one or more databases. The information security server of FIG. 2 is only an example. In practice, the information security server may include at least some of the same components shown in the example of FIG. 2 in addition to other components that are not shown. Furthermore, the components of the information security server of FIG. 2 may be implemented on one or more devices.

Modified protected file creation engine 202 is configured to create a modified protected file based on a template file and a protected file. In some embodiments, the protected file is an OpenXML file. In some embodiments, the protected file is a PDF file. In some embodiments, the protected file is received from a device. In some embodiments, modified protected file creation engine 202 is configured to select the template file from template files database 206. In some embodiments, the selected template file is associated with the same file format as the format of the protected file. For example, if the protected file comprises an OpenXML file, then the selected template file also comprises an OpenXML file. Or for example, if the protected file comprises a PDF file, then the selected template file also comprises a PDF file. Template files are at least partially unprotected. The unprotected portion of a template file includes instructions (e.g., in text, images, audio, video) that describe what a user should do to enable a device without the IRM client installed or a device on which an IRM client is not permitted to be installed to render the protected file. The unprotected portion of the template file (e.g., the instructions) may be displayed by a device without the IRM client installed or a device on which an IRM client is not permitted to be installed. Modified protected file creation engine 202 is configured to create a modified protected file using the protected file and the template file, where the resulting modified protected file includes the protected file and at least a portion of the template file. Depending on whether the protected file comprises an OpenXML file or a PDF file, modified protected file creation engine 202 is configured to process the protected file and the template file together differently, as will be further described below. In some embodiments, modified protected file creation engine 202 is configured to send a created modified protected file back to the device from which it received the protected file.

Authentication engine 204 is configured to process access requests associated with protected files associated with IRM techniques. For example, authentication engine 204 is configured to authenticate and/or authorize users associated with received access requests. In some embodiments, an IRM client installed at a device at which a protected file is attempted to be accessed sends an access request to authentication engine 204. For example, the protected file may be included in a modified protected file. In some embodiments, authentication engine 204 is configured to search for a set of security information from security information database 210 that match information in the access request. In some embodiments, based on the retrieved security information (e.g., key and/or policy information), authentication engine 204 is configured to determine whether the user or device associated with the access request should be granted access to the protected file. In the event that authentication engine 204 determines that access is granted, authentication engine 204 is configured to notify the IRM client of the device that sent the request to display the contents of the protected file. Otherwise, in the event that authentication engine 204 determines that access is not granted, authentication engine 204 is configured to notify the IRM client of the device that sent the request to not display the contents of the protected file.

Template files database 206 is configured to store template files. Template files database 206 is configured to store template files of one or more different formats. In some embodiments, new template files or updated versions of existing template files are deposited at template files database 206 over time. For example, if the instructions that describe what a user should do to enable a device without the IRM client installed or a device on which an IRM client is not permitted to be installed to render a protected file is updated, a new template may be created. For example, a set of instructions may instruct the user to download an IRM application specific for the device and the IRM application is associated with the capability to view protected files.

IRM application code database 208 is configured to store sets of computer code and/or logic for IRM applications. An IRM application could be installed at a device that does not include the IRM client and be used to read protected files, such as those associated with modified protected files. For example, a device that can only render the unprotected portion of a modified protected file that includes the set of instructions may request to download a version of the IRM application code that is associated with a type associated with the device from IRM application code database 208. IRM application code database 208 may store a different version of the IRM application code for each type of operating system or type of device. IRM application code database 208 is configured to send the appropriate version of the IRM application code to each requesting device.

Figure 3:
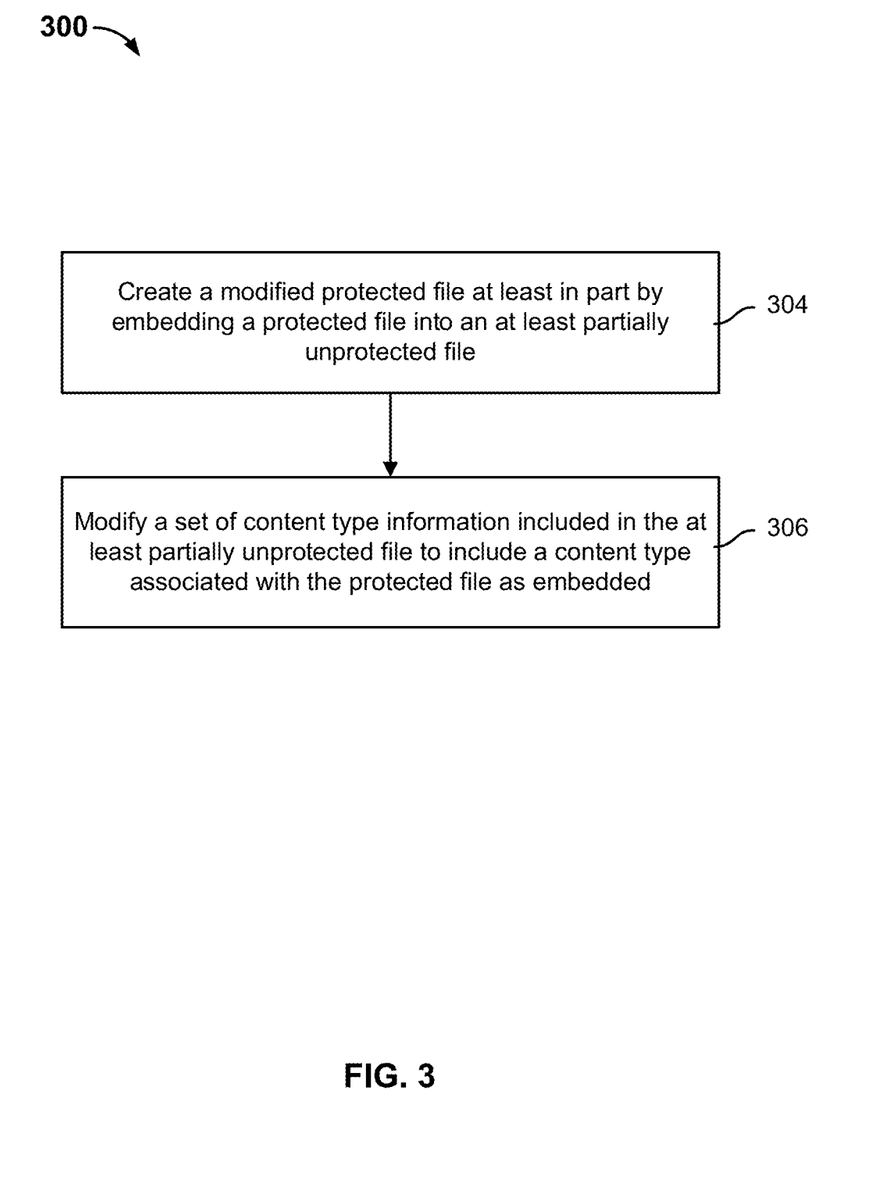
FIG. 3 is a flow diagram showing an embodiment of a process for creating a modified protected file.

FIG. 3 is a flow diagram showing an embodiment of a process for creating a modified protected file. In some embodiments, process 300 is implemented at system 100 of FIG. 1.

In some embodiments, a protected file is received. The protected file is associated with IRM-related protection. In some embodiments, the protected file is encrypted. In some embodiments, the protected file is associated with an OpenXML format.

At 304, a modified protected file is created at least in part by embedding the protected file into an at least partially unprotected file. In some embodiments, the at least partially unprotected file comprises a template file that includes instructions for viewing the protected file. The template file is associated with the same file format as the protected file.

For example, if the protected file were an OpenXML file, then the template file would also be an OpenXML file. An OpenXML file is a container file (a ZIP archive) that includes multiple files. The protected file may be embedded as another file into the ZIP archive of the template file. The embedded protected file may be named "irmprotected.irm." Embedding the protected file into the ZIP archive of the template file may be thought of as wrapping the template file around the protected file.

At 306, a set of content type information included in the at least partially unprotected file is modified to include a content type associated with the protected file as embedded. The set of content type information included in the template file includes data that indicates the various content types of files that are included in the ZIP archive. The set of content type information is used to validate the files within the ZIP archive where a file in the ZIP archive of a content type that is not included in the set of content type information would cause a validation failure. So, the content type (e.g., extension) of the embedded protected file is added to the set of content type information to prevent validation failure.

Returning to the OpenXML example, the set of content type information for the OpenXML file format is the default file named Content_Types.xml that is included in every OpenXML file. Because the extension of the embedded protected file is ".irm", the Content_Types.xml file is modified so that it includes a reference to the content type with an extension of ".irm".

Figure 4:
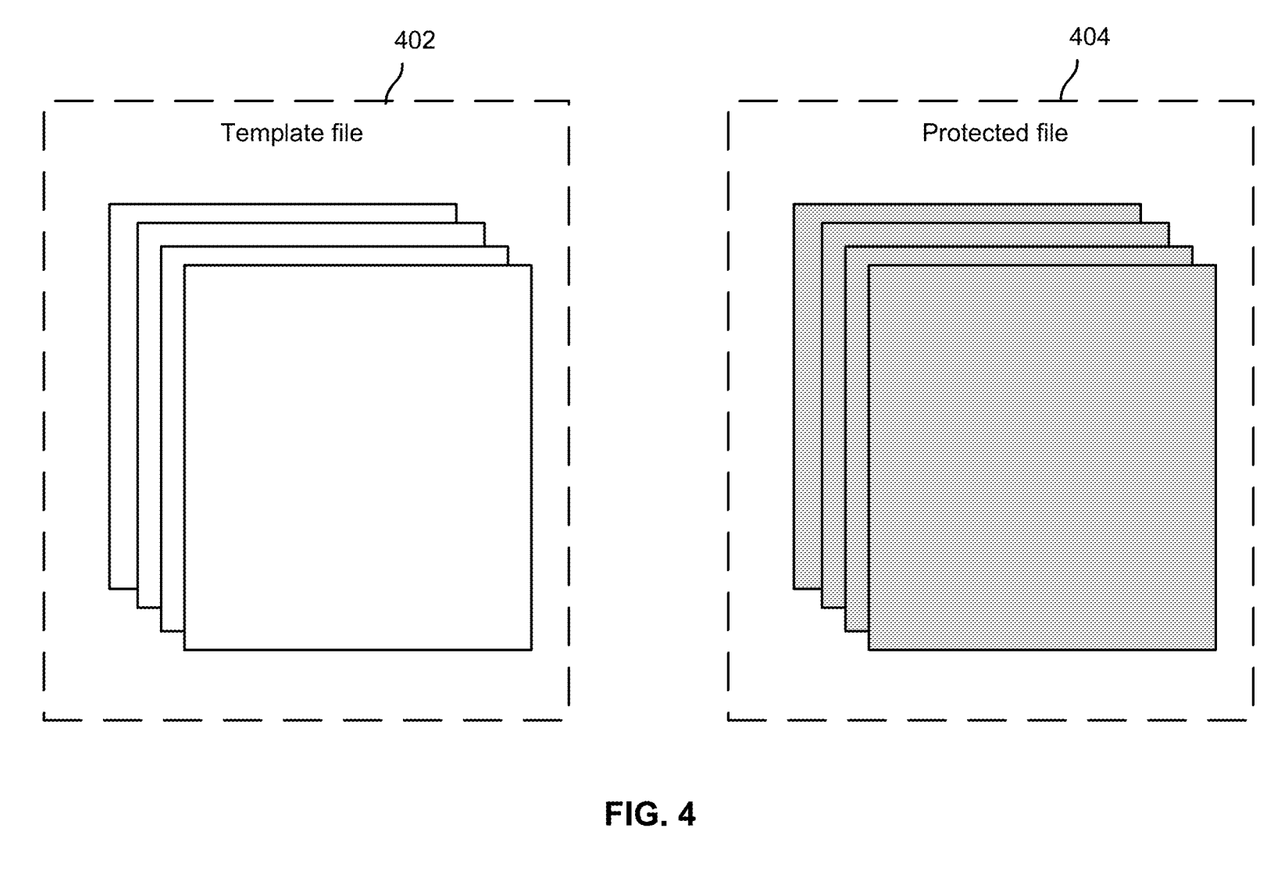
FIG. 4 is a diagram showing example representations of two OpenXML files.

FIG. 4 is a diagram showing example representations of two OpenXML files. In the example, representation 402 is associated with a template file in the OpenXML file format and representation 404 is associated with a protected file in the OpenXML file format. The template file is unprotected and includes instructions for viewing the protected file. The protected file includes user data to which access is controlled by IRM protection techniques. The OpenXML file format was introduced with Microsoft Office 2007. Each OpenXML file is a ZIP archive (a container file) that includes multiple files. Each OpenXML file includes files that describe application data and metadata and also files that describe the relationships between files within the ZIP archive. Because an OpenXML is a container file that includes multiple files, each of representation 402 that is associated with the template file in the OpenXML file format and representation 404 that is associated with the protected file in the OpenXML file format is shown to be a package of files. As will be discussed below, the protected file may be embedded into the template file to create a modified protected file.

Figure 5:
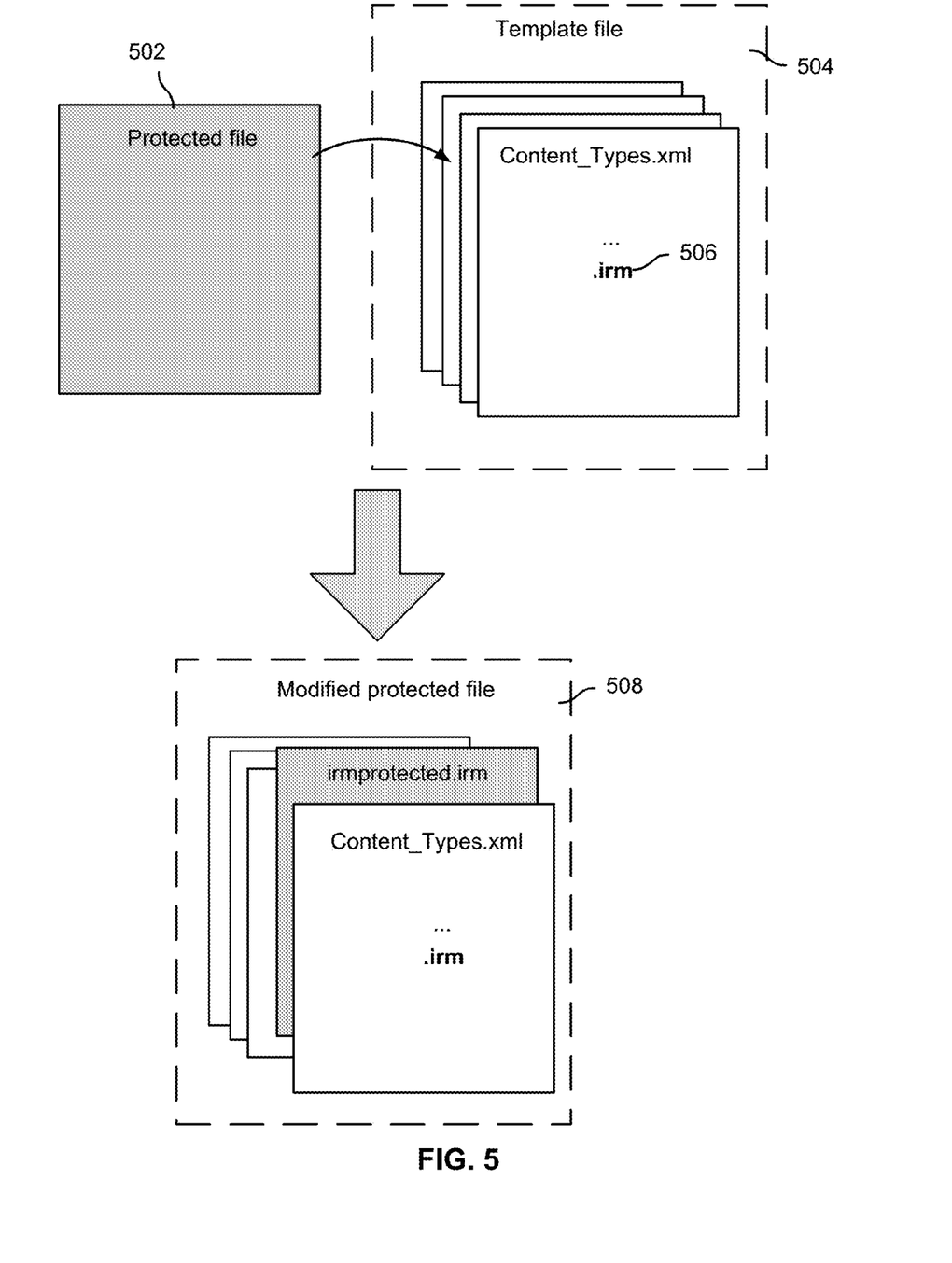
FIG. 5 is a diagram showing an example of creating a modified protected file in the OpenXML file format.

FIG. 5 is a diagram showing an example of creating a modified protected file in the OpenXML file format. This example shows applying a process such as process 300 to a template file and a modified file, both of which are in the OpenXML file format. In the example, protected file 502 is embedded into the ZIP archive of template file 504. To do this, template file 504 may be opened with a ZIP library and an extra data stream with protected file 502 is embedded in the ZIP archive of template file 504. The embedded protected file is called "irmprotected.irm" in this example. Additionally, extension ".irm" 506 associated with the embedded protected file is added to the content types included in the Content_Types.xml file in the ZIP archive of template file 504. As a consequence, modified protected file 508, which is also in the OpenXML file format, is created.

As shown in the example, modified protected file 508 includes the embedded protected file called "irmprotected.irm" and includes a Content_Types.xml file that has been modified to include the ".irm" extension.

Modified protected file 508 may be received at a device. As will be described below, if the receiving device includes the IRM client, then the embedded protected file, "irmprotected.irm", will be extracted and displayed for the user. However, if the receiving device does not include the IRM client, then the embedded protected file, "irmprotected.irm" will not be used and only the portions of the original template file 504, including the instructions for viewing the protected file, will be extracted and displayed for the user.

Figure 6:
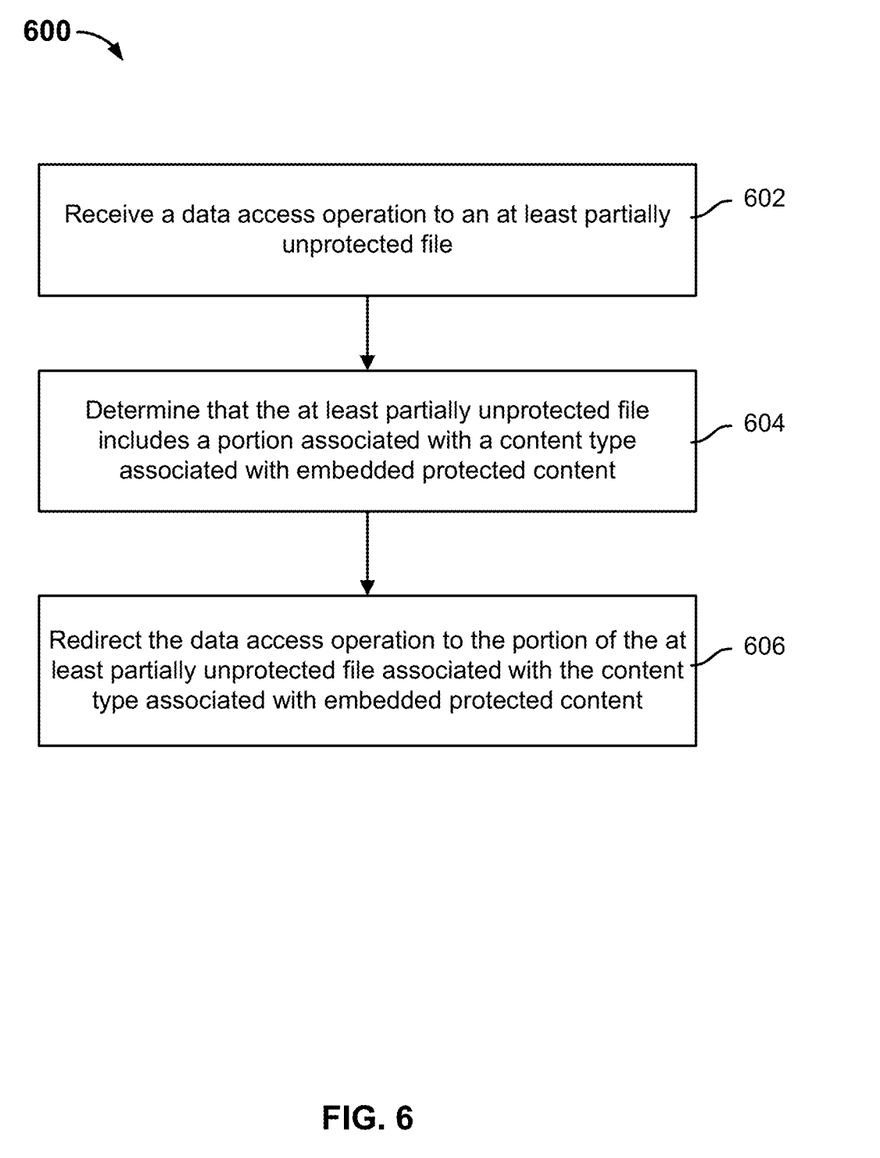
FIG. 6 is a flow diagram showing an embodiment of a process for displaying a modified protected file at a device that includes the IRM client.

FIG. 6 is a flow diagram showing an embodiment of a process for displaying a modified protected file at a device that includes the IRM client. In some embodiments, process 600 is implemented at system 100 of FIG. 1.

Process 600 is used to display the protected content from a received file at a device that has the IRM client installed.

At 602, a data access operation to an at least partially unprotected file is received. In some embodiments, the at least partially unprotected file was received at a device (e.g., through email). For example, the received at least partially unprotected file comprises a modified protected file such as modified protected file 508 of FIG. 5. In response to a user's selection to open the file, a viewer application at the device makes a data access operation (call) to open the file. The call may be intercepted by the IRM client.

At 604, it is determined that the at least partially unprotected file includes a portion associated with a content type associated with embedded protected content. In response to receiving the data access operation, the IRM client may check the at least partially unprotected file for any embedded protected content (e.g., associated with an extension that is associated with embedded protected content) that might have been inserted. In the event that the embedded protected file (e.g., "irmprotected.irm") is found, the content of the protected file is extracted, decrypted, and stored in a temporary file.

At 606, the data access operation is redirected to the portion of the at least partially unprotected file associated with the content type associated with embedded protected content. The viewer application's call is redirected to the temporary file so that the viewer application may display the decrypted content associated with the protected file. In some embodiments, the redirection provided by the IRM client is transparent to the viewer application that displays the content of the protected file. In some embodiments, at the device that includes the IRM client, the remainder of the received file that is not associated with the protected file, such as the instructions portion of the original template file, is ignored and not displayed at the device.

While a device that includes the IRM client such as the device described in process 600 may display the protected content of a modified protected file, a device that does not include the IRM client will not be able to display the protected content. Instead, a viewer application at a device without the IRM client (e.g., a device with the Apple® iOS® software such as an iPad®) will examine the modified protected file for portions that it can recognize and display, such as the instructions for viewing the protected file, but ignore the embedded protected file. Even though a viewer application at a device without the IRM client will not be able to display the protected file of a received modified protected file, it will determine that the file is valid because the Content_Types.xml includes the extension (e.g., ".irm") associated with the protected file. Furthermore, the displayed instructions for viewing the protected file at a device without the IRM client may prompt the user of the device to download the special IRM application for the device. Once that IRM application has been downloaded, the protected file of the modified protected file may be opened using the IRM application.

Figure 7:
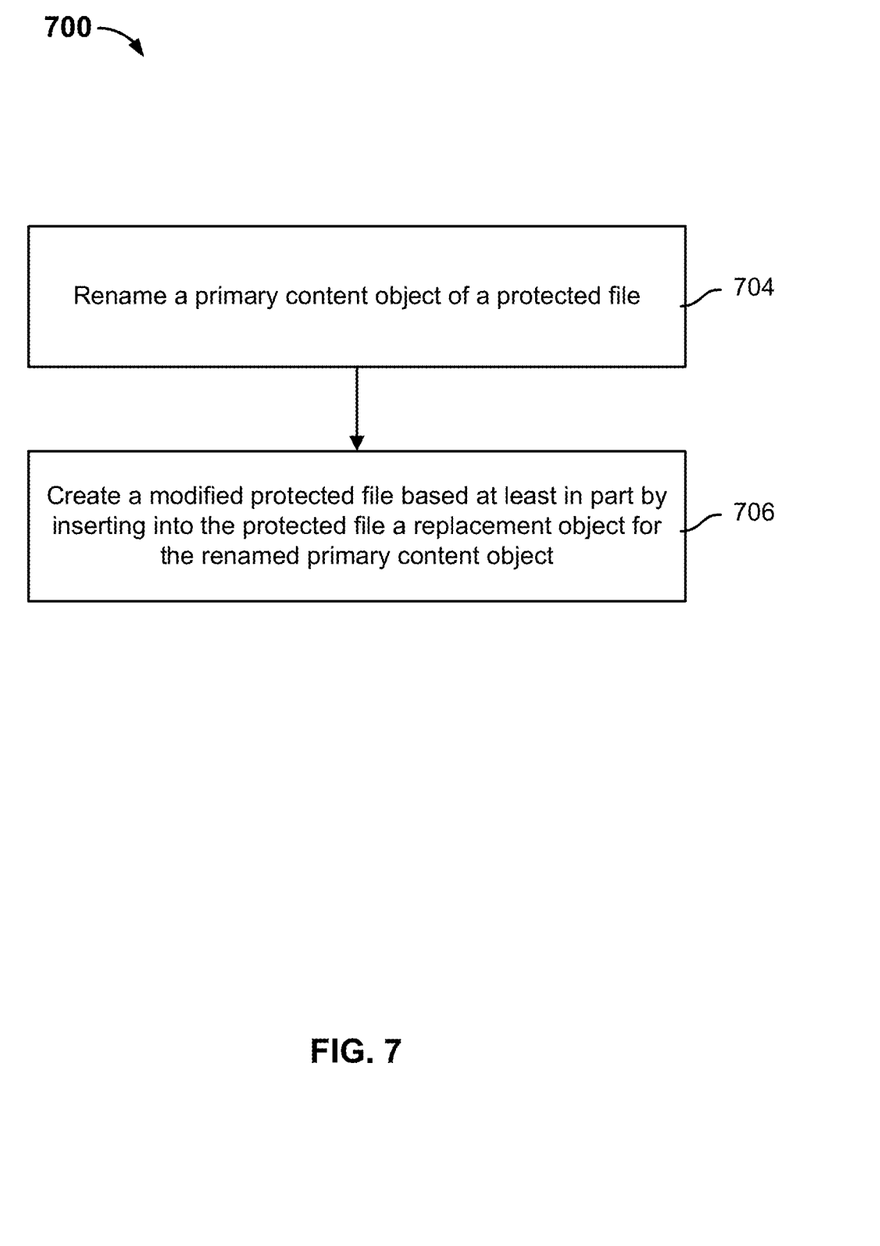
FIG. 7 is a flow diagram showing an embodiment of a process for creating a modified protected file.

FIG. 7 is a flow diagram showing an embodiment of a process for creating a modified protected file. In some embodiments, process 700 is implemented at system 100 of FIG. 1.

In some embodiments, a protected file is received. The protected file is associated with IRM-related protection. In some embodiments, the protected file is encrypted. In some embodiments, the protected file is associated with a PDF file format.

At 704, a primary content object from the protected file is renamed. In some embodiments, the content objects of the first page of the protected file are renamed so that they are hidden. For example, COS objects of the first page of a protected PDF file are made to be hidden.

At 706, a modified protected file is created based at least in part by inserting into the protected file a replacement object for the renamed primary content object. In some embodiments, a template file with instructions for viewing the protected file is received. The template file is associated with the same file format as the protected file. For example, if the protected file were a PDF file, then the template file would also be a PDF file. The relevant COS objects of the first page of the template PDF file are extracted. The replacement objects that are inserted into the first page of the protected file comprise the COS objects extracted from the template file.

Figure 8:
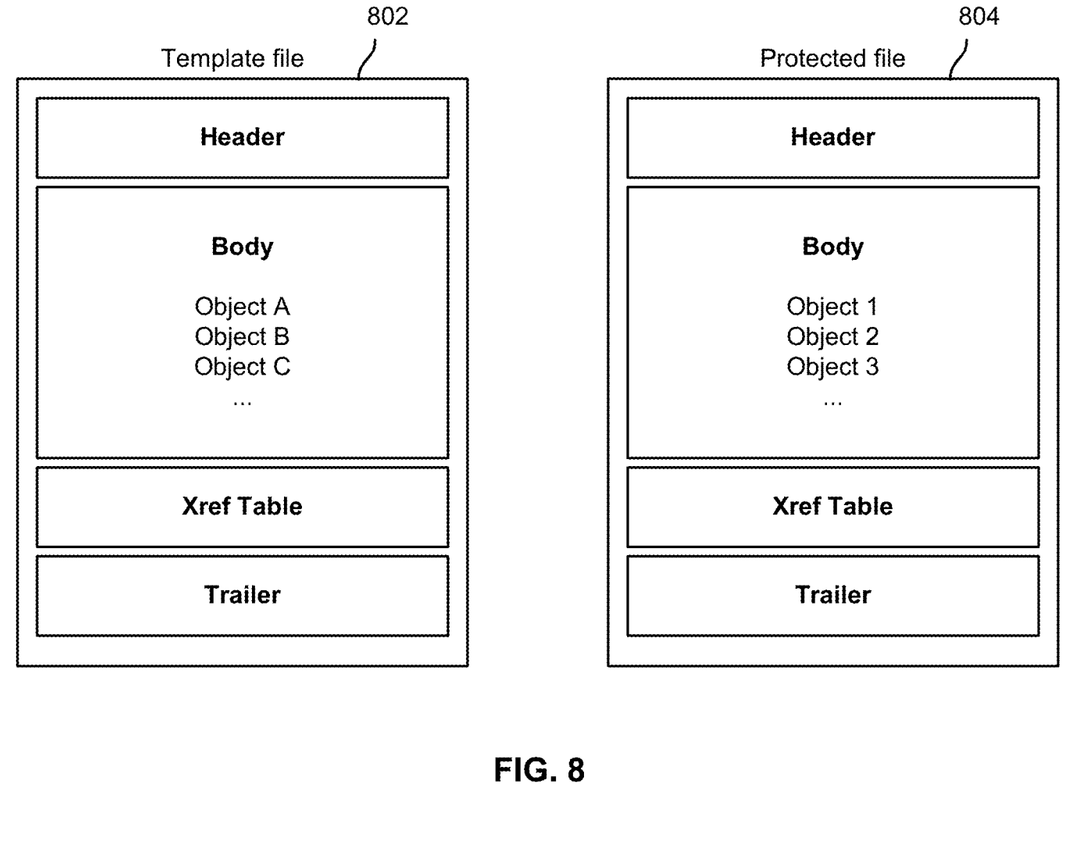
FIG. 8 is a diagram showing example representations of two PDF files.

FIG. 8 is a diagram showing example representations of two PDF files. In the example, representation 802 is associated with a template file in the PDF file format and representation 804 is associated with a protected file in the PDF file format. The template file is unprotected and includes instructions for viewing the protected file. The protected file includes user data to which access is controlled by IRM protection techniques. Each PDF file includes several elements, including: header, body, cross-reference table ("Xref Table"), and trailer. The content objects in the body of the PDF file comprise COS objects that represent document components such as bookmarks, pages, fonts, and annotations, for example. In the example, template file 802 includes the following objects in the first page: Object A, Object B, and Object C. Object A, Object B, and Object C of the first page of template file 802 include instructions for viewing the protected file. In the example, protected file 804 includes the following objects in the first page: Object 1, Object 2, and Object 3. As will be discussed below, objects from the protected file may be renamed and objects extracted from the template file may be inserted into the protected file to create a modified protected file.

Figure 9:
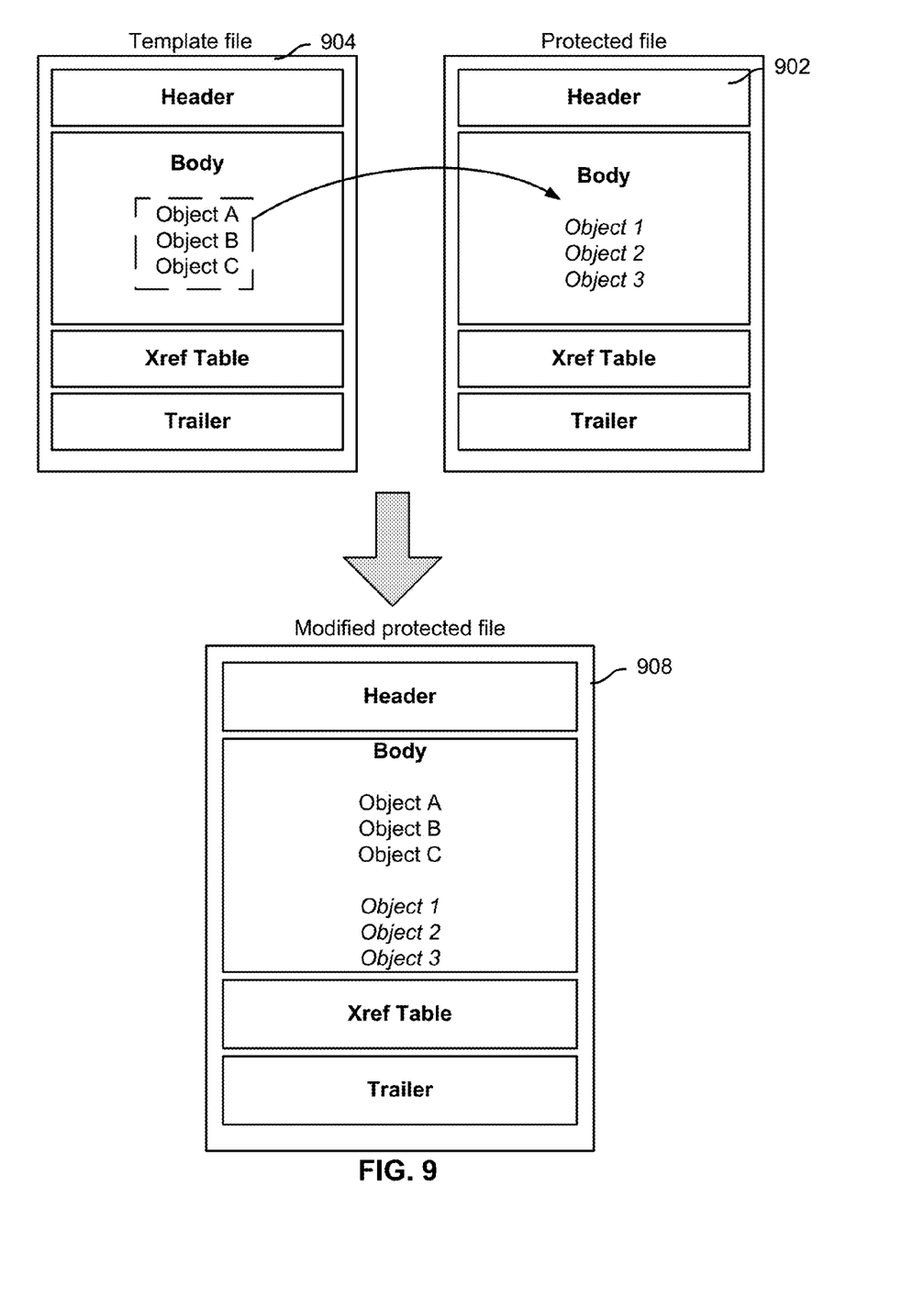
FIG. 9 is a diagram showing an example of creating a modified protected file in the PDF file format.

FIG. 9 is a diagram showing an example of creating a modified protected file in the PDF file format. This example shows applying a process such as process 800 to a template file and a protected file, both of which are in the PDF file format. In the example, Object 1, Object 2, and Object 3 of the first page of protected file 902 are renamed (the renamed objects are represented as italicizations of the object names) so that they will become data that will not be recognized by a device without an IRM client installed on it. Object A, Object B, and Object C of the first page of template file 904 are extracted and inserted into the first page of protected file 902. As a consequence, modified protected file 908, which is also in the PDF file format, is created. As shown in the example, modified protected file 908 includes the objects copied over from the first page of template file 904 (Object A, Object B, and Object C) meanwhile objects that are in the original first page of protected file 902 (Object 1, Object 2, and Object 3) are renamed such that they become hidden.

Figure 10:
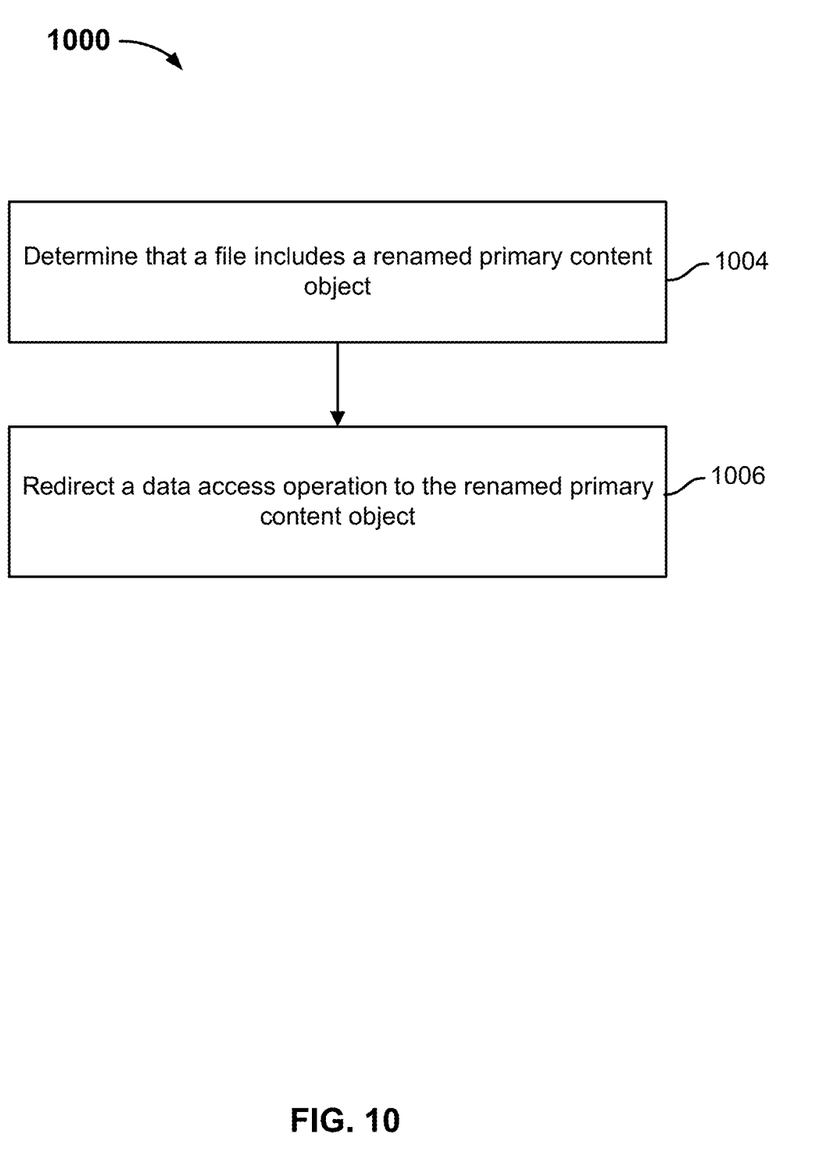
FIG. 10 is a flow diagram showing an embodiment of a process for displaying a modified protected file at a device that includes the IRM client.

FIG. 10 is a flow diagram showing an embodiment of a process for displaying a modified protected file at a device that includes the IRM client. In some embodiments, process 1000 is implemented at system 100 of FIG. 1.

Process 1000 is used to display the protected content from a received file at a device that has the IRM client installed.

In some embodiments, a file is received. In some embodiments, the file was received at a device (e.g., through email). For example, the received file comprises a modified protected file such as modified protected file 908 of FIG. 9.

At 1004, it is determined that the file includes a renamed primary content object. The IRM client installed on the device will determine whether one or more renamed objects that would otherwise be hidden to a device without the IRM client are present in the file. The renamed objects are known to be associated with protected content. In the event that such renamed object(s) are found, the renamed objects from the first page of the file are extracted and decrypted.

At 1006, a data access operation to the renamed primary content object is redirected. In some embodiments, if a renamed object is determined in the file, then a data access operation (e.g., by a viewer application that is capable of opening IRM-protected content and/or is associated with an IRM client) is redirected to the renamed primary content that is associated with protected content. The one or more renamed objects are displayed. The decrypted content from the first page of the file is displayed (because it is assumed that the viewer application displays the first page of a PDF file that it opens first).

While a device that includes the IRM client such as the device described in process 1000 may display the protected content of a modified protected file, a device that does not include the IRM client will not be able to display the protected content. Instead, a viewer application at a device without the IRM client (e.g., a device with the Apple® iOS® software such as an iPad®) will examine the modified protected file for portions that it can recognize and can display, such as the instructions for viewing the protected file, but ignore the hidden, renamed objects of the protected file. Because the unprotected objects associated with instructions for viewing the protected file were only inserted into the first page of the protected file, if the user scrolls to a second page or beyond of the modified protected file, the viewer application that is not working in conjunction with an IRM client may fail to display content because it cannot display the protected content on the second and subsequent pages of the modified protected file. Furthermore, the displayed instructions for viewing the protected file at a device without the IRM client may prompt the user of the device to download the special IRM application for the device. Once that IRM application has been downloaded, the protected file of the modified protected file may be opened using the IRM application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to provide secure access to data, comprising:
a processor configured to:
- rename a protected primary content object of a protected file, wherein the protected file comprises an encrypted Portable Document Format File (PDF);
- receive a template file, wherein the template file comprises an unprotected file, wherein the template file comprises an unencrypted PDF file;
- extract an unprotected replacement object from the template file, wherein the unprotected replacement object includes data configured to be rendered as a set of instructions associated with viewing a modified protected file at a first device at which an IRM client is not installed;
- create the modified protected file based at least in part by inserting into the protected file the unprotected replacement object,
- wherein the modified protected file comprises unprotected content including the unprotected replacement object and protected content including the renamed protected primary content object; and
- send the modified protected file to a second device; and a memory coupled to the processor and configured to store the protected file.

2. The system of claim 1, wherein the protected primary content object comprises a COS object.

3. The system of claim 1, wherein the protected primary content object is located at a first page of the protected file and wherein the modified protected file is created by inserting the unprotected replacement object into the first page of the protected file.

4. The system of claim 1, wherein the protected primary content object is configured to represent one or more of the following document components: a bookmark, a page, a font, and an annotation.

5. The system of claim 1,
wherein the IRM client is not installed at the second device, wherein a viewer application installed at the second device is configured to determine that the modified protected file includes the unprotected replacement object and display content included in the unprotected replacement object.

6. The system of claim 1,
wherein the IRM client is installed at the second device, wherein a viewer application installed at the second device is configured to determine that the modified protected file includes the renamed protected primary content object, redirect a data access operation to the renamed protected primary content object, and display content included in the renamed protected primary content object.

7. A method to provide secure access to data, comprising:
- renaming a protected primary content object of a protected file, wherein the protected file comprises an encrypted Portable Document Format File (PDF);
- receiving a template file, wherein the template file comprises an unprotected file, wherein the template file comprises an unencrypted PDF file;
- extracting an unprotected replacement object from the template file, wherein the unprotected replacement object includes data configured to be rendered as a set of instructions associated with viewing a modified protected file at a first device at which an IRM client is not installed;
- creating the modified protected file based at least in part by inserting into the protected file the unprotected replacement object,
- wherein the modified protected file comprises unprotected content including the unprotected replacement object and protected content including the renamed protected primary content object; and
- sending the modified protected file to a second device.

8. The method of claim 7, wherein the protected primary content object comprises a COS object.

9. The method of claim 7, wherein the protected primary content object is located at a first page of the protected file and wherein the modified protected file is created by inserting the unprotected replacement object into the first page of the protected file.

10. The method of claim 7, wherein the protected primary content object is configured to represent one or more of the following document components: a bookmark, a page, a font, and an annotation.

11. The method of claim 7,
wherein the IRM client is not installed at the second device, wherein a viewer application installed at the second device is configured to determine that the modified protected file includes the unprotected replacement object and display content included in the unprotected replacement object.

12. The method of claim 7,
wherein the IRM client is installed at the second device, wherein a viewer application installed at the second device is configured to determine that the modified protected file includes the renamed protected primary content object, redirect a data access operation to the renamed protected primary content object, and display content included in the renamed protected primary content object.

* * * * *